United States Patent [19]
Brown

[11] 3,860,216
[45] Jan. 14, 1975

[54] AUTOMOBILE WITH SELF CONTAINED JACKS

[75] Inventor: George E. Brown, Brighton, Ala.

[73] Assignee: The Raymond Lee Organization, Inc., New York, N.Y.; a part interest

[22] Filed: Oct. 19, 1973

[21] Appl. No.: 408,117

[52] U.S. Cl. ............................................. 254/86 H
[51] Int. Cl. .............................................. B60s 9/02
[58] Field of Search. 254/86 R, 86 H, 93 R, 93 VA, 254/124; 212/145; 280/150.5

[56] References Cited
UNITED STATES PATENTS

| | | | |
|---|---|---|---|
| 2,115,328 | 4/1938 | DeCola et al. | 254/86 H |
| 2,322,358 | 6/1943 | Hansen | 254/86 H |
| 2,383,666 | 8/1945 | Martin | 254/86 H |

FOREIGN PATENTS OR APPLICATIONS

| | | | |
|---|---|---|---|
| 532,868 | 2/1941 | Great Britain | 254/86 H |

Primary Examiner—Othell M. Simpson

[57] ABSTRACT

In combination with an automobile or other vehicle having a plurality of wheels, each wheel being rotatable about a horizontal axle: a like plurality of jacks, each jack including a support shoe, each jack being associated with a corresponding wheel and cooperating with the corresponding axle. Each jack has an extended position at which the shoe engages the ground to hold the axle in proper position whether or not the wheel is in position and having a withdrawn position at which the shoe is held above ground level adjacent the axle. The jacks are operated by means controllable from the vehicle to place each jack in either one of extended and withdrawn positions.

1 Claim, 2 Drawing Figures

PATENTED JAN14 1975  3,860,216
FIG. 1
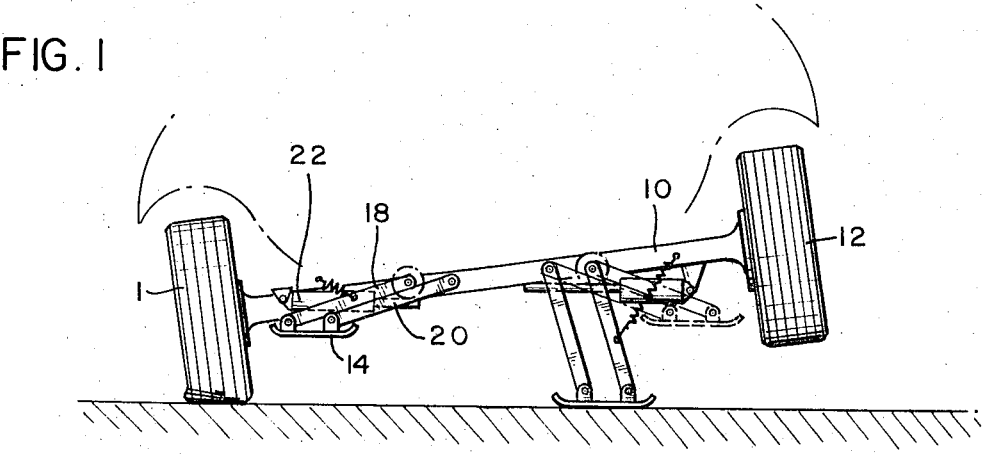
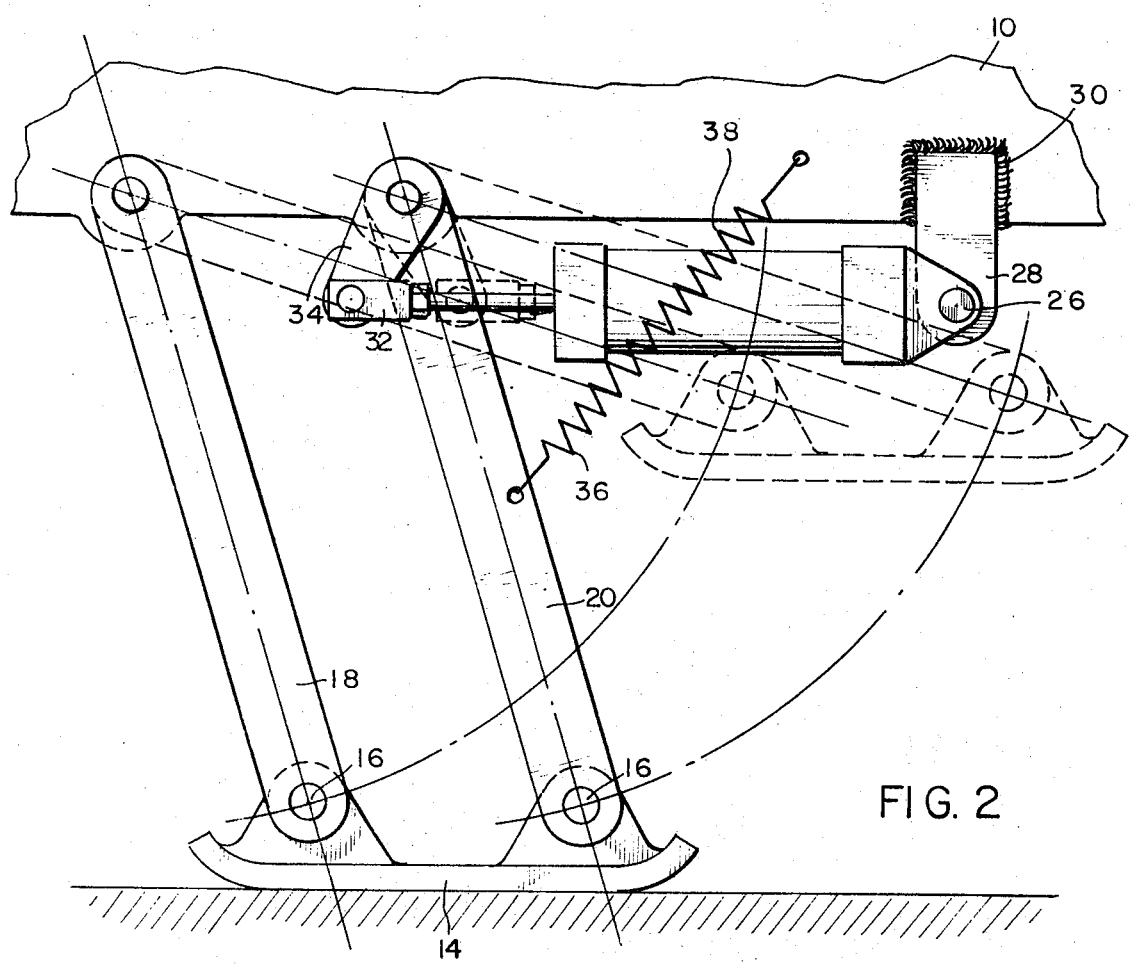
FIG. 2

AUTOMOBILE WITH SELF CONTAINED JACKS

SUMMARY OF THE INVENTION

My invention is directed toward an automobile or other vehicle provided with self contained jacks for each wheel whereby tire changing and other operations are facilitated.

To this end, each wheel is rotatable about a horizontal axle. Each jack is associated with a corresponding wheel and cooperates with a corresponding axle. Each jack includes a separate support shoe. Moreover, each jack has an extended position at which the shoe engages the ground to hold the axle in proper position whether or not the wheel is in position and has a withdrawn position at which the shoe is held above ground level adjacent the axle. The jacks are operated, typically hydraulically, by means controllable from the vehicle to place each jack in either one of extended and withdrawn positions.

BRIEF DESCRIPTION OF THE DRAWINGS

In the drawings:
FIG. 1 is a side view of my invention; and
FIG. 2 is an enlarged detail view thereof.

DETAILED DESCRIPTION OF PREFERRED EMBODIMENTS

Referring now to FIGS. 1-2, an automobile has axles 10 with wheels 12 secured to each end. Associated with each wheel is a shoe 14 pivotally secured at 16 to the lower ends of two parallel inclined rods 18 and 20. The top ends of these rods are pivotally secured to the axle.

A horizontal cylinder 22 has a closed end with a tip 24 pivotally secured at 26 to the bottom of a vertical bracket 28 extending upward into a bore 30 in axle 10. The other end of the cylinder carries an axially extending hydraulically controlled piston 32. The free end of the piston is pivotally secured to one end of linkage 34. The other end of this linkage is secured to rod 20.

When the cylinder is hydraulically actuated by a control accessible by the driver of the vehicle, the piston is extended and the shoe lowered to ground level to support the axle in horizontal position despite tire failure on the wheel. Deactivation of the cylinder causes withdrawal of the piston, raising the shoe toward the axle and out of the way.

Safety spring 36 connected between the axle and rod 20 pulls the shoe upward and out of the way in case of failure of hydraulic control. Spring 38 connected between the axle and cylinder holds the cylinder out of the way in the event of linkage breakage or the like.

While I have described my invention with particular reference to the drawings, such is not to be considered as limiting its actual scope.

I claim:
1. In combination with an automobile or other vehicle having a plurality of wheels, each wheel being rotatable about a horizontal axle, a like plurality of jacks, each jack being associated with a corresponding wheel and axle, each jack including first and second parallel inclined elongated rods pivotally secured at their upper ends to the corresponding axle, said rods lying in essentially the same plane as said axle, a support shoe pivotally secured to the lower ends of both rods and essentially parallel to the corresponding axle, a horizontal hydraulic cylinder disposed below the corresponding axle, said cylinder having a front end pivotally secured to said corresponding axle and a rear end with a horizontal axially disposed shaft movable into and out of the cylinder, one end of the shaft always being exposed, a linkage pivotally secured at one end to the free end of the shaft and pivotally secured at the other end to the upper end of the nearest one of the two rods, and means controllable from the vehicle to provide hydraulic control for said cylinder, said means placing the jack in either one of extended or withdrawn positions, said shoe engaging the ground to hold the axle in proper position when the jack is in extended position and being held above ground level adjacent the axle when the jack is in withdrawn position.

* * * * *